(12) United States Patent
Shimomura et al.

(10) Patent No.: US 8,662,969 B2
(45) Date of Patent: Mar. 4, 2014

(54) HYBRID WORKING MACHINE

(75) Inventors: Keisuke Shimomura, Hiroshima (JP);
Kouji Yonezawa, Hiroshima (JP);
Takayuki Okunishi, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 957 days.

(21) Appl. No.: 12/782,977

(22) Filed: May 19, 2010

(65) Prior Publication Data
US 2010/0297926 A1 Nov. 25, 2010

(30) Foreign Application Priority Data

May 25, 2009 (JP) ................................. 2009-125359

(51) Int. Cl.
*B60H 1/26* (2006.01)
*B60K 6/42* (2007.10)
*B60R 16/04* (2006.01)

(52) U.S. Cl.
USPC ........ 454/141; 454/158; 180/65.22; 180/68.5

(58) Field of Classification Search
USPC ...................... 454/158, 141; 180/68.5, 65.22
See application file for complete search history.

(56) References Cited

U.S. PATENT DOCUMENTS

| | | | |
|---|---|---|---|
| 4,349,078 A * | 9/1982 | Shimada et al. ............ | 180/69.1 |
| 5,504,655 A * | 4/1996 | Underwood et al. ........ | 361/707 |
| 5,534,364 A * | 7/1996 | Watanabe et al. ............... | 429/61 |
| 5,620,057 A * | 4/1997 | Klemen et al. ............... | 180/68.5 |
| 5,681,668 A * | 10/1997 | Reed et al. .................... | 429/100 |
| 6,315,069 B1 * | 11/2001 | Suba et al. .................... | 180/68.5 |
| 6,540,036 B1 * | 4/2003 | Sugano ........................ | 180/68.1 |
| 6,678,972 B2 * | 1/2004 | Naruse et al. ................... | 37/466 |
| 6,745,860 B2 * | 6/2004 | Yabe ............................ | 180/68.1 |
| 6,789,335 B1 * | 9/2004 | Kinugawa et al. .............. | 37/348 |
| 6,901,903 B2 * | 6/2005 | Nakajima et al. ......... | 123/198 E |
| 6,902,020 B2 * | 6/2005 | Kronner et al. ............. | 180/68.5 |
| 7,007,767 B2 * | 3/2006 | Damon ........................ | 180/68.5 |

(Continued)

FOREIGN PATENT DOCUMENTS

| | | |
|---|---|---|
| JP | 3649147 | 2/2005 |
| JP | 2007-107230 | 4/2007 |

OTHER PUBLICATIONS

U.S. Appl. No. 12/782,970, filed May 19, 2010, Shimomura, et al.
U.S. Appl. No. 12/782,952, filed May 19, 2010, Shimomura, et al.

*Primary Examiner* — Kang Hu
*Assistant Examiner* — Jonathan Cotov
(74) *Attorney, Agent, or Firm* — Oblon, Spivak, McClelland, Maier & Neustadt, L.L.P.

(57) ABSTRACT

In a hybrid working machine including a power storage device serving as a power source for a generator motor and a controller for controlling this power storage device, the power storage device and the controller being each made up of a main body and casing covering the main body, the power storage device is arranged on the upper side of a top plate of a stand provided on an upper frame, the controller is arranged on the lower side, an intake port is provided in the casing of the power storage device, an exhaust port is provided in the casing of the controller, a ventilation port is provided in the top plate, and the cooling air is fed into the interior of the power storage device and the controller, so that the power storage device and the controller are cooled down.

3 Claims, 7 Drawing Sheets

(56) References Cited

U.S. PATENT DOCUMENTS

| | | | |
|---|---|---|---|
| 7,014,002 B2* | 3/2006 | Mizuta | 180/68.5 |
| 7,079,379 B2* | 7/2006 | Yamaguchi et al. | 361/676 |
| 7,134,518 B2* | 11/2006 | Arai et al. | 180/68.1 |
| 7,374,208 B2* | 5/2008 | Yamamoto et al. | 280/834 |
| 7,388,301 B2* | 6/2008 | Komiyama et al. | 290/40 C |
| 7,398,849 B2* | 7/2008 | Yoshida | 180/68.5 |
| 7,410,415 B2* | 8/2008 | Ronnlund et al. | 454/162 |
| 7,607,501 B2* | 10/2009 | Smith et al. | 180/68.1 |
| 7,654,351 B2* | 2/2010 | Koike et al. | 180/68.5 |
| 7,688,582 B2* | 3/2010 | Fukazu et al. | 361/690 |
| 7,733,065 B2* | 6/2010 | Yoon et al. | 320/150 |
| 7,810,596 B2* | 10/2010 | Tsuchiya | 180/68.5 |
| 7,810,597 B2* | 10/2010 | Imashige | 180/69.2 |
| 7,905,307 B2* | 3/2011 | Kubota et al. | 180/68.1 |
| 8,002,063 B2* | 8/2011 | Rydberg et al. | 180/68.5 |
| 8,016,063 B2* | 9/2011 | Tsuchiya | 180/68.5 |
| 8,037,963 B2* | 10/2011 | Nishimura et al. | 180/291 |
| 8,042,637 B2* | 10/2011 | Nagata et al. | 180/68.5 |
| 8,100,210 B2* | 1/2012 | Takeuchi et al. | 180/68.5 |
| 8,312,952 B2* | 11/2012 | Taneda et al. | 180/68.5 |
| 8,381,856 B2* | 2/2013 | Shimomura et al. | 180/68.5 |
| 8,540,042 B2* | 9/2013 | Atarashi et al. | 180/68.1 |
| 2001/0007292 A1* | 7/2001 | Yabf | 180/68.1 |
| 2003/0047366 A1* | 3/2003 | Andrew et al. | 180/68.5 |
| 2004/0079570 A1* | 4/2004 | Mizuta | 180/68.5 |
| 2005/0001606 A1* | 1/2005 | Kagoshima | 323/371 |
| 2007/0042263 A1* | 2/2007 | Balash | 429/99 |
| 2008/0006459 A1* | 1/2008 | Niebuhr | 180/68.5 |
| 2008/0078597 A1* | 4/2008 | Voigt et al. | 180/68.5 |
| 2009/0178868 A1* | 7/2009 | Oohashi | 180/68.5 |
| 2009/0199553 A1* | 8/2009 | Nishimura et al. | 60/486 |
| 2009/0277707 A1* | 11/2009 | Ballard | 180/68.2 |
| 2009/0314557 A1* | 12/2009 | Takeuchi et al. | 180/65.1 |
| 2010/0068983 A1* | 3/2010 | Williams | 454/184 |
| 2010/0175940 A1* | 7/2010 | Taneda et al. | 180/68.5 |
| 2010/0224426 A1* | 9/2010 | Shimada et al. | 180/6.5 |
| 2010/0297926 A1* | 11/2010 | Shimomura et al. | 454/141 |
| 2011/0005846 A1* | 1/2011 | Page et al. | 180/8.7 |
| 2011/0027632 A1* | 2/2011 | Higashino et al. | 429/83 |

* cited by examiner

F I G . 4
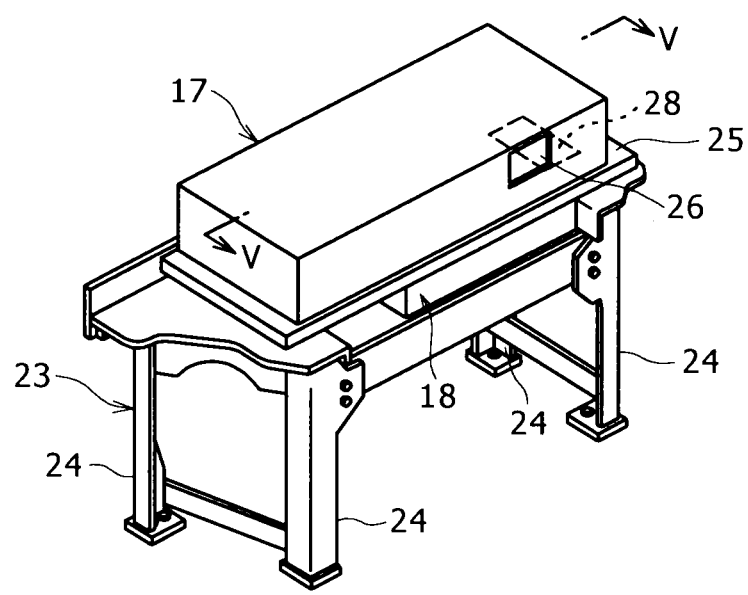

HYBRID WORKING MACHINE

BACKGROUND OF THE INVENTION

1. Field of the Invention

The present invention relates to a hybrid working machine for which engine power and electric power are used in combination.

2. Description of the Related Art

The related art will be described taking an excavator as an example.

As shown in FIG. 7, in the excavator, an upper rotating body 2 is mounted on a crawler type lower traveling body 1 rotatably around a vertical axis which is vertical to the ground. A working attachment 9 including a boom 3, an arm 4, a bucket 5 and including a boom cylinder 6, an arm cylinder 7 and a bucket cylinder 8 for, respectively, actuating the boom, the arm and the bucket is attached to a front part of this upper rotating body 2.

A cabin 10 is mounted on the left side of the front part of the upper rotating body 2, and a counterweight 11 is equipped on a rear end of the upper rotating body.

An engine room 12 is provided on a rear part of the upper rotating body 2, and an engine 13 serving as a power source is installed in this engine room 12 (refer to Japanese Patent No. 3649147 (hereinafter, referred to as Patent Document 1)).

It should be noted that in the present specification, expressions "front and rear" and "left and right" indicate the directions seen from an operator who sits in the cabin 10.

FIG. 8 shows a block configuration of a drive system and a control system in a case of a hybrid type excavator.

A generator motor 14 for performing a generator operation and a motor operation and a hydraulic pump 15 are connected to the engine 13, and driven by the engine 13.

Discharge oil from the hydraulic pump 15 is supplied to hydraulic actuators such as the boom cylinder 6, the arm cylinder 7 and the bucket cylinder 8 shown in FIG. 7 and a left and right traveling hydraulic motor (not shown) through a control valve (which is the collective of plural valves each of which is provided for each of the actuators respectively) 16, so that the hydraulic actuators are driven.

Meanwhile, a power storage device (a power battery) 17 made up of a secondary battery or the like is connected to the generator motor 14 through a controller 18, and a rotation motor 19 serving as a rotation driving source is connected to the generator motor 14 through an inverter 20.

The controller 18 controls charging and discharging operations and the like of the power storage device 17 in accordance with excess and deficiency of generator output of the generator motor 14.

The inverter 20 switches the generator motor 14 between the generator operation and the motor operation, and controls generated power or an electric current as the motor or torque.

Conventionally, hybrid devices mounted in such a hybrid type excavator are installed in the engine room 12 or the like as shown in Japanese Patent Laid-Open No. 2007-107230 (hereinafter, referred to as Patent Document 2).

Here, there is a need for cooling down the power storage device 17 and the controller 18 which generate heat themselves and are sensitive to heat among the hybrid devices, in order to ensure the original performance and the life.

In this case, as a cooling method, an air cooling method for taking in the cooling air from the exterior and passing the air between targeted devices is the most advantageous in terms of cost, space and the like.

In the known techniques shown in Patent Documents 1 and 2, the power storage device 17 and the controller 18 (hereinafter, both may be collectively referred to as the both devices) are arranged side by side on the plane where the other hybrid devices and the hydraulic pump 15 and the control valve 16 serving as hydraulic devices.

However, in the hybrid working machine, since the hybrid devices are added to limited space of the existing machine, installation space for the devices is restricted.

Therefore, in the known techniques with arrangement on the same plane, a lot of devices including the both devices 17, 18 are concentrated on narrow space, and sufficient space for a passage of the cooling air cannot be obtained around the both devices 17, 18.

Thus, flow of the cooling air to the both devices 17, 18 is deteriorated so that cooling efficiency is decreased.

In a case where the devices 17, 18 are each made up of a main body and casing covering the main body, the cooling air indirectly cools down the main bodies over the casings. Thus, the cooling efficiency is also decreased due to this point.

In accordance with these points, the known techniques have a problem that the performance and the life of the both devices 17, 18 are lowered.

SUMMARY OF THE INVENTION

The present invention is to provide a hybrid working machine capable of efficiently cooling down a power storage device and a controller.

The present invention is a hybrid working machine, including an upper rotating body provided with a working attachment and rotatably mounted on a lower traveling body, and hybrid devices mounted on the upper rotating body, the hybrid devices including a power storage device serving as a power source for a generator motor for performing a generator operation and a motor operation, and a controller for controlling the power storage device, in which the power storage device and the controller are each made up of a main body and casing covering the main body, and arranged so as to overlap each other in the up and down direction in a state that a partition plate is placed between the power storage device and the controller, an intake port is provided in one of the casings, an exhaust port is provided in the other casing, a ventilation port is provided in the partition plate, and cooling air taken from the intake port into the one of the casings is introduced into the other casing through the ventilation port, and exhausted from the exhaust port, so that the power storage device and the controller are cooled down.

According to the present invention, the power storage device and the controller are arranged in the up and down direction through the partition plate (a top plate of a stand in claim 3). Therefore, a passage of the cooling air is easily ensured in a circumference thereof, and particularly the device on the upper side is extremely well ventilated without any obstacles.

Moreover, the exclusive cooling air for the both devices can be introduced into the casings of the both devices so as to directly and effectively cool down the main bodies.

In accordance with these points, it is possible to increase cooling efficiency and ensure the original performance and the life of the both devices.

In addition, there is no need for adding extra passage facilities, since the interior of the casings is utilized as the passage of the cooling air, and the both devices are cooled down by a common cooling structure. Therefore, the present invention is advantageous in terms of cost and space.

Since the both devices are arranged in the up and down direction, the following effects can be obtained.

i) Since the both devices are connected by a wire, closely related to each other and hence often inspected at the same time, the both devices are desirably arranged close to each other. In this case, the known techniques in which the both devices are arranged on the same plane are disadvantageous in terms of maintenance and wiring, since the both devices are not easily arranged close to each other. Even when the both devices are arranged close to each other, sufficient space cannot be obtained between the both devices and between the both devices and the other devices. Therefore, the known techniques are still disadvantageous in terms of the maintenance and the wiring.

Meanwhile, according to the present invention, it is possible to arrange the both devices close to each other within limited space and also ensure sufficient space in the circumference as described above. Further, it is possible to utilize the ventilation port as a distribution hole for the wire connecting the both devices. In accordance with the above points, the maintenance and the wiring are easily performed.

ii) Utilization efficiency for space can be increased. Thereby, device layout is easily determined. Alternatively, device occupancy space can be reduced so as to decrease a rotation radius of a rear end of the machine.

In the present invention, preferably, the power storage device is arranged on the upper side and the controller is arranged on the lower side relative to the partition plate in the above configuration.

In this case, the power storage device which is particularly sensitive to heat is arranged on the upper side where the cooling efficiency is finer. Therefore, it is possible to prevent failure of the power storage device due to the heat so as to improve the life.

In the present invention, a stand including a plurality of supports and a top plate may be provided on an upper frame constituting the upper rotating body, and the power storage device and the controller may be installed with the top plate of this stand used as the partition plate in any of the above configurations.

BRIEF DESCRIPTION OF THE DRAWINGS

FIG. 4 is a perspective view of a state that the power storage device and the controller are built into the stand;

DESCRIPTION OF THE PREFERRED EMBODIMENTS

An embodiment of the present invention will be described with FIGS. 1 to 6.

Figure 7:
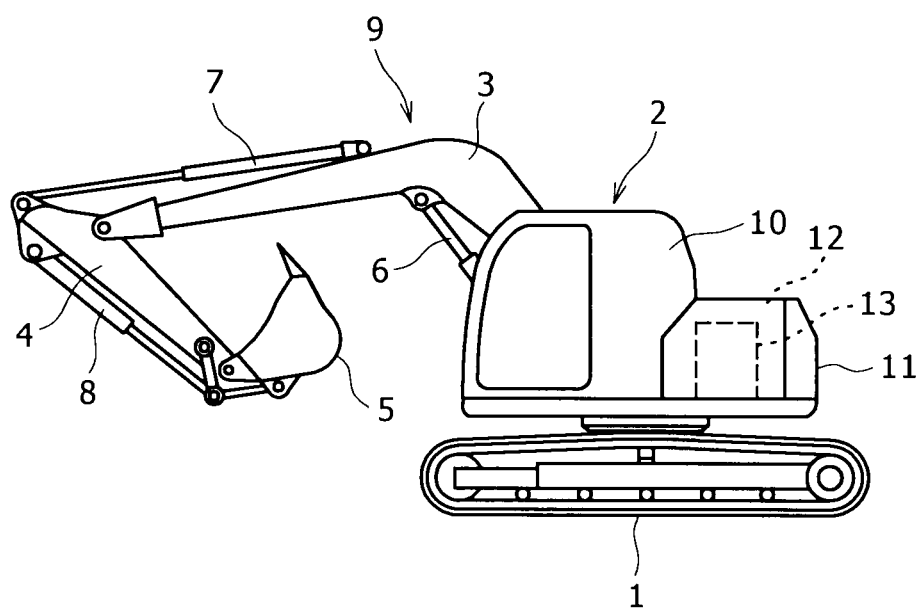
FIG. 7 is a schematic side view of an excavator to which the present invention is applied as an example.
Figure 8:
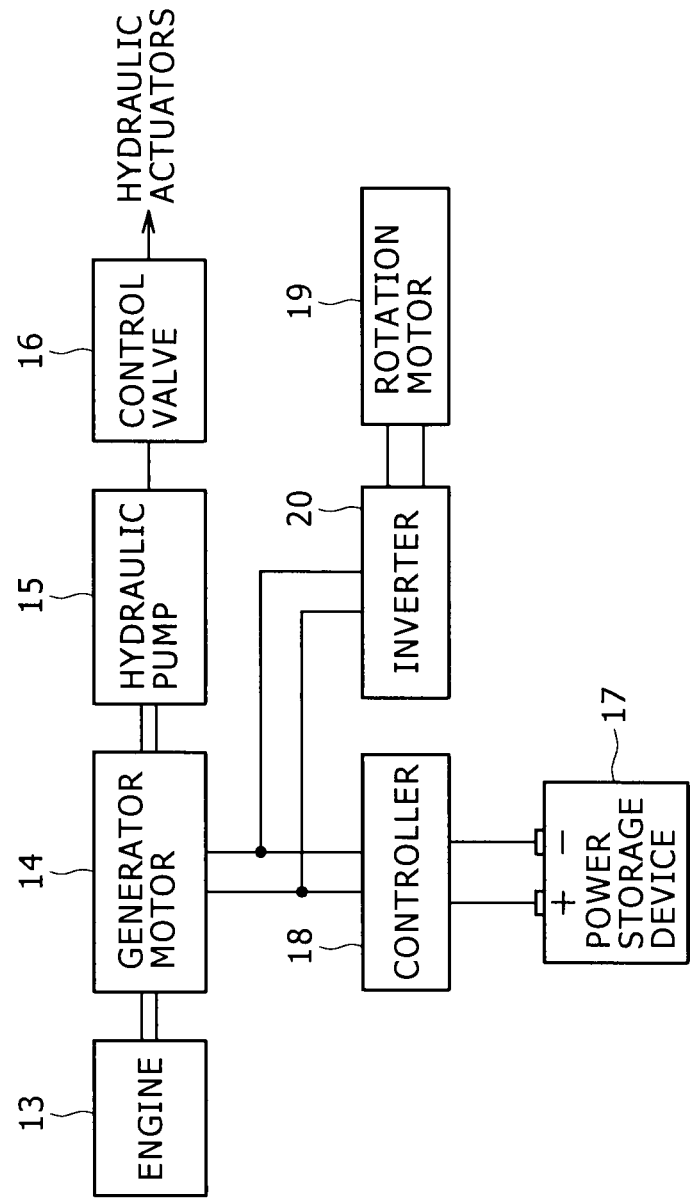
FIG. 8 is a block configuration diagram of a drive system and a control system in a case of a hybrid excavator.

In the embodiment, the present invention is applied to a hybrid excavator shown in FIGS. 7 and 8.

It should be noted that in the embodiment, among the members and devices to be equipped or mounted in the hybrid excavator, the same ones as in FIGS. 7 and 8 are given the same reference numerals.

Figure 1:
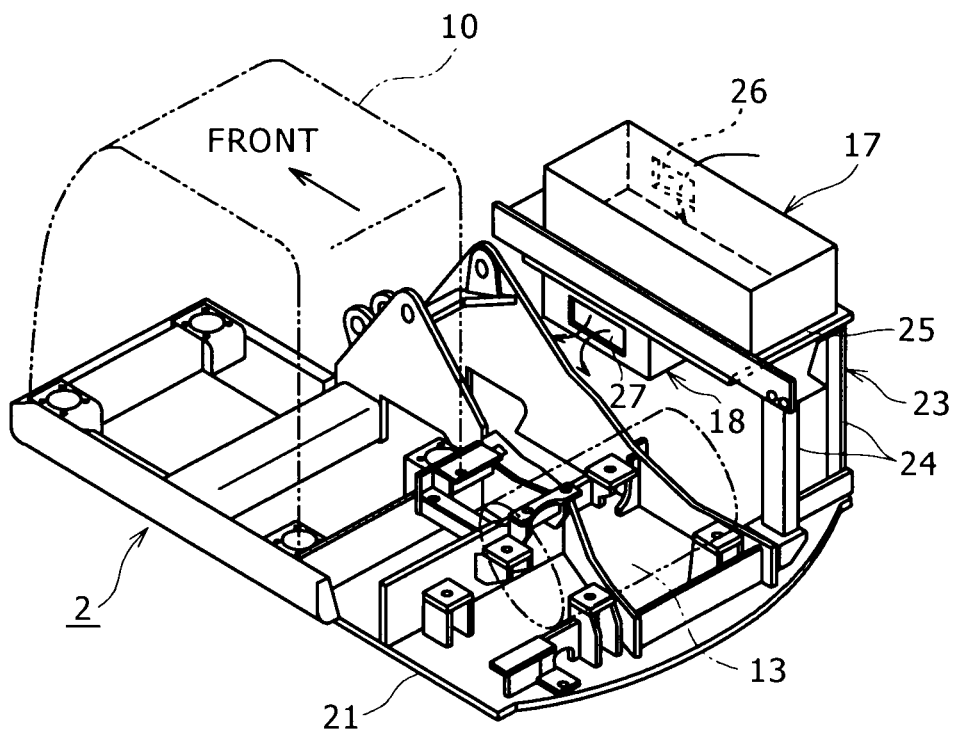
FIG. 1 is a perspective view of an upper frame of an upper rotating body in a hybrid excavator in an embodiment of the present invention.
Figure 2:
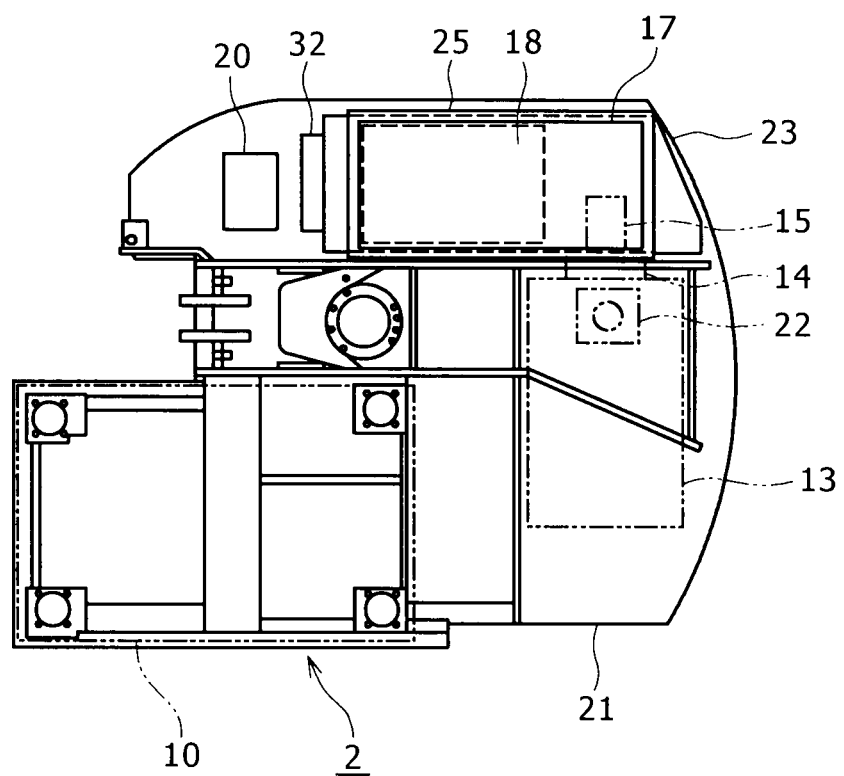
FIG. 2 is a side view of the upper frame.
Figure 3:
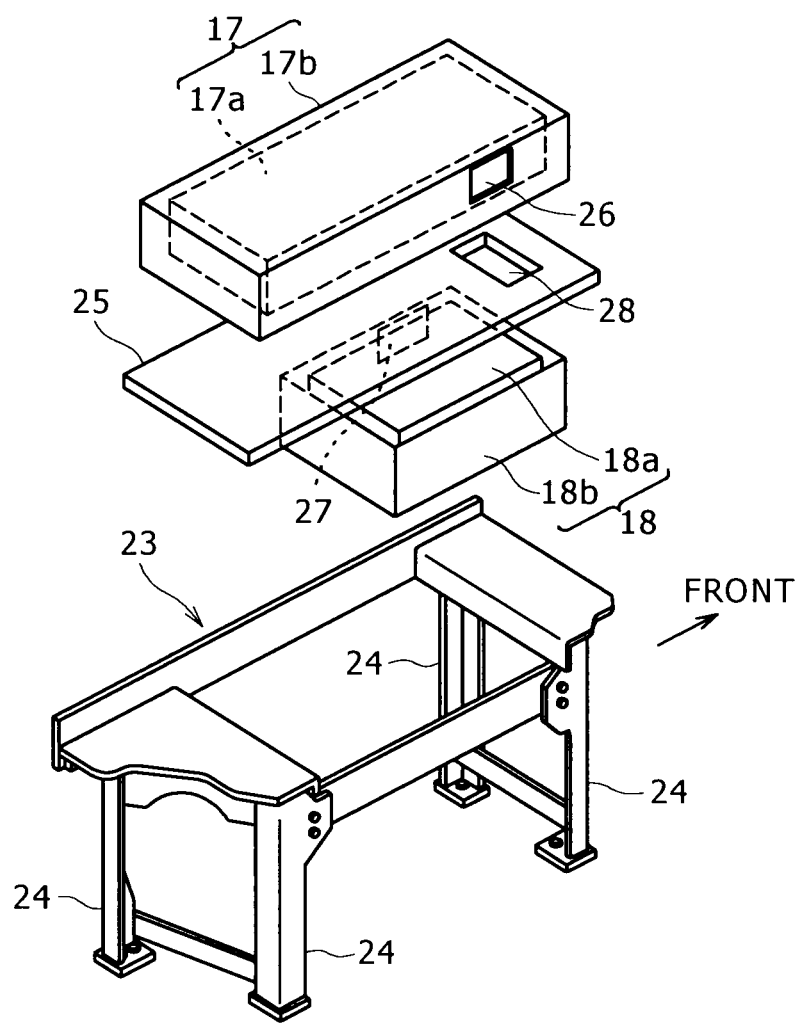
FIG. 3 is an exploded perspective view of a stand provided on the upper frame, and a power storage device and a controller to be built into the stand.

In FIGS. 1, 2, the reference numeral 21 denotes an upper frame constituting an upper rotating body 2. A working attachment 9 in FIG. 7 is equipped on a substantial center of a front part of this upper frame 21. A cabin 10 is mounted on the left side of the front part of the upper frame 21. An engine 13 is mounted on a rear part of the upper frame 21. A generator motor 14 and a hydraulic pump 15 are connected to the engine 13. In FIG. 2, the reference numeral 22 denotes a muffler of the engine 13.

A stand 23 is attached to the rear part of the upper frame 21 on a right side deck (on the diagonally rearward right seen from an operator in the cabin 10). A plurality of devices including hybrid devices such as a power storage device 17 and a controller 18 is built into this stand 23.

This point will be described in detail.

As shown in FIGS. 3 to 6 in detail, the stand 23 serves as a self-standing and assembling type of independent stand which is formed by combining four front, rear, left and right supports 24 (the supports may be five or more) by beam members (the reference numeral thereof is omitted) and horizontally attaching a top plate 25 between upper ends of the supports 24.

Figure 5:
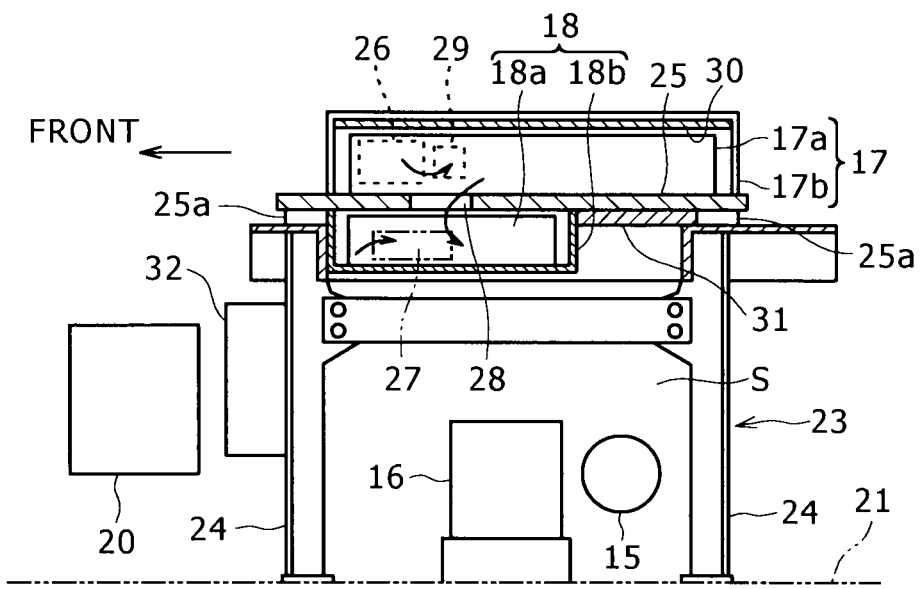
FIG. 5 is a sectional view taken from line V-V of FIG. 4.
Figure 6:
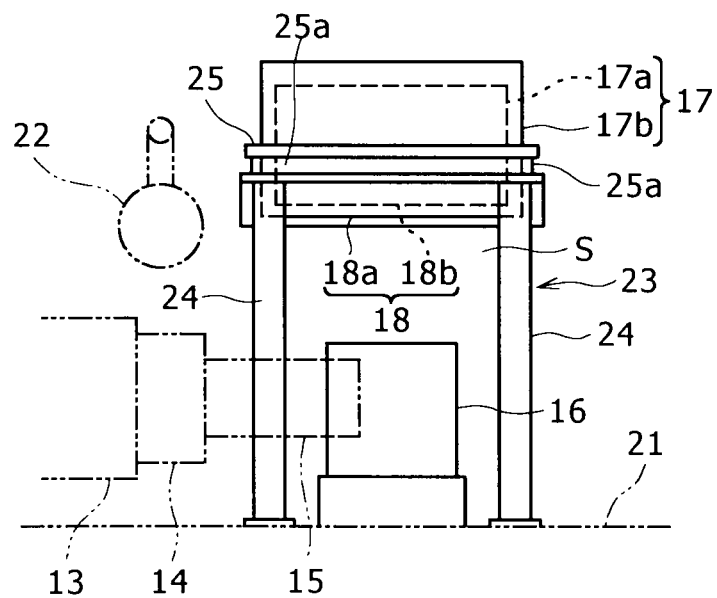
FIG. 6 is a back view of a state of FIG. 4.

This stand 23 is attached to the upper frame 21 detachably at lower ends of the supports 24 in a state that the hydraulic pump 15 and a control valve 16 are accommodated in space S below the top plate 25 as shown in FIGS. 5, 6. The power storage device 17 is installed on the upper surface side of the top plate 25, and the controller 18 is installed on the lower surface side.

That is, the power storage device 17 and the controller 18 are arranged so as to overlap each other in the up and down direction in a state that a partition plate (the top plate 25) is placed between the power storage device and the controller.

The power storage device 17 and the controller 18 are each made up of a main body 17a or 18a and casing 17b or 18b covering the main body, and attached to the top plate 25 so that the main bodies face each other relative to the top plate 25.

It should be noted that the casing 17b of the power storage device is formed into a box with an open lower surface, and the casing 18b of the controller is formed into a box with an open upper surface. The casing 17b of the power storage device is installed on the top plate 25 through vibration-proof mounts 25a (refer to FIGS. 5, 6).

An intake port 26 is provided on a right side surface of the casing 17b of the power storage device 17, and an exhaust port 27 is provided on a left side surface of the casing 18b of the controller 18. A ventilation port 28 providing communication between the casings 17b, 18b is provided at a position on the top plate 25 where the both devices overlap each other.

It should be noted that wire sheets or filters for preventing invasion of foreign substances are provided in the intake port 26 and the exhaust port 27 although not shown in the figures.

A suction fan 29 is provided in the casing 17b of the power storage device 17. The external air (the cooling air) introduced into the power storage device 17 (the casing 17b) by this suction fan 29 is fed into the controller 18 (the casing 18b) from the ventilation port 28 as shown by arrows in FIGS. 1, 5 and exhausted from the exhaust port 27 after cooling.

Meanwhile, as means for protecting the main body 17a of the power storage device against heat from the exterior, as shown in FIG. 5, a heat insulating member 30 for blocking solar heat is provided on the inner side of an upper surface of the casing 17b, and a heat insulating member 31 for blocking heat from the hydraulic pump 15 and the control valve 16 serving as heat-generating hydraulic devices is provided on a lower surface of the top plate.

It should be noted that as the means for protecting the main body 17a of the power storage device against the solar heat, the upper surface of the casing 17b may be formed into a double layer structure including outer and inner plates so as to form an air layer, and a large number of escape holes for releasing the heat enclosed in this air layer to the exterior may be provided on a peripheral surface of the casing. In this case, the heat insulating member 30 is not necessarily provided, or may be provided on the lower side of the air layer so as to form a double heat insulating structure.

Further, heat shield plates (not shown) are attached to front, rear left and right side surfaces (between the supports) of the stand 23 so as to surround the space S for the hydraulic devices.

These heat shield plates prevent situations that the heat from the hydraulic devices (the hydraulic pump 15, the control valve 16) is transferred through the outer peripheral side of the stand to the power storage device 17 on the top plate 25 or radiated onto electric devices installed around the stand 23 other than the power storage device 17 (such as an inverter 20 installed on the front side of the stand as described later), and that the heat in the engine room including the heat from the muffler 22 invades the space S of the stand 23.

Among the heat shield plates, the heat shield plate on the left side surface also serves as a guard member and is provided so as to cover the exhaust port 27 as well. Therefore, an opening for releasing the air exhausted from the exhaust port 27 to the exterior is provided in this heat shield plate also serving as the guard member.

A converter 32 for normally controlling the battery is attached to the front surface of the stand 23, and the inverter 20 is installed in front of the stand on the upper frame 21 through another stand (not shown).

As described above, since the power storage device 17 and the controller 18 are arranged in the up and down direction through the partition plate (the top plate 25), a passage of the cooling air is easily ensured in a circumference thereof.

Since the power storage device 17 on the upper side is particularly arranged at the highest position among all the other devices, the power storage device is well ventilated without any obstacles around and hence effectively cooled down.

Moreover, the exclusive cooling air for the both device 17, 18 is introduced into the casings 17b, 18b of them so as to directly cool down the main bodies, and the suction fan 29 offers forcible air intake and exhaust. Therefore, it is possible to efficiently cool down the both main bodies 17a, 18a.

In accordance with these points, it is possible to increase cooling efficiency and ensure the original performance and the life of the both devices 17, 18.

Particularly, a cooling effect of the power storage device 17 which is sensitive to the heat is increased. Thus, failure due to the heat is prevented and a life improving effect is remarkable.

In addition, there is no need for adding extra facilities, since the interior of the casings 17b, 18b is utilized as the passage of the cooling air, and the both devices 17, 18 are cooled down by a common cooling structure. Therefore, the present invention is advantageous in terms of cost and space.

Since the both devices 17, 18 are arranged in the up and down direction, the following effects can be obtained.

i) It is possible to arrange the both devices 17, 18 close to each other within limited space and also ensure sufficient space in the circumference as described above. Further, it is possible to utilize the ventilation port 28 as a distribution hole for a wire connecting the both devices 17, 18. In accordance with the above points, maintenance and wiring are easily performed.

ii) Utilization efficiency for space can be increased. Thereby, device layout is easily determined. Alternatively, device occupancy space can be reduced so as to decrease a rotation radius of a rear end of the machine.

OTHER EMBODIMENTS (1) The suction fan 29 may be provided in the vicinity of the ventilation port 28 or the exhaust port 27 of the casing 18b of the controller.

Alternatively, a push-in fan may be used instead of the suction fan 29. Further, such a fan is not necessarily provided, so that the air is suctioned and exhausted by a natural convection current. It this case, there is a possibility that the intake port 26 in the above embodiment functions as an exhaust port and the exhaust port 27 functions as an intake port according to circumstances.

(2) In the above embodiment, the self-standing and assembling type of stand 23 which is independent from the upper frame 21 is installed, and the power storage device 17 and the controller 18 are, respectively, built on the upper and lower sides of the top plate 25, as the partition plate, of this stand 23. However, a shelf shape partition plate may be provided on the upper frame 21 as part of the upper frame 21, and the both devices 17, 18 may be installed on the upper and lower sides of this partition plate respectively.

(3) The power storage device 17 and the controller 18 are desirably arranged in a right rear part where there is a little fear of deteriorating working visibility from the interior of the cabin 10 as in the above embodiment. However, the both devices 17, 18 may be arranged at other positions in accordance with convenience for layout.

Although the invention has been described with reference to the preferred embodiments in the attached figures, it is noted that equivalents may be employed and substitutions made herein without departing from the scope of the invention as recited in the claims.

What is claimed is:

1. A hybrid working machine, comprising:
    a crawler type lower traveling body;
    an upper rotating body rotatably mounted around a vertical axis which is vertical to the ground on said lower traveling body;
    a working attachment provided on said upper rotating body;
    hybrid devices mounted on said upper rotating body, said hybrid devices including
        a power storage device serving as a power source for a generator motor for performing a generator operation and a motor operation, and
        a controller for controlling charging and discharging operations for said power storage device; and
    a partition plate,
    wherein said power storage device and said controller each includes a main body and a casing covering said main body, said power storage device and said controller being arranged so as to overlap each other in an up and down direction, and the partition plate being placed between said respective casings of said power storage device and said controller,
    wherein an intake port is provided in a first casing of said casings,
    wherein an exhaust port is provided in a second casing of said casings,
    wherein a ventilation port is provided in said partition plate to introduce cooling air taken from said intake port in the first casing into the second casing through said ventilation port, and to exhaust the cooling air from said exhaust port, so that said power storage device and said controller are cooled down, wherein an uppermost casing of the first and second casings has an opening at a lower surface thereof, and a lowermost casing of the first and second casings has an opening at an upper surface thereof, wherein a portion of the partition plate is located between the respective openings of the first and second casings, and wherein the ventilation port is formed at a position where the openings of the first and second casings overlap each other to provide communication between the first and second casings through the ventilation port.

2. The hybrid working machine according to claim 1, wherein said power storage device is arranged on an upper side and said controller is arranged on a lower side relative to said partition plate.

3. The hybrid working machine according to claim 1, further comprising a stand including a plurality of supports and a top plate, the top plate constituting the partition plate, and the stand provided on an upper frame constituting said upper rotating body, and wherein said power storage device and said controller are arranged with said top plate of said stand used as said partition plate.

* * * * *